といった

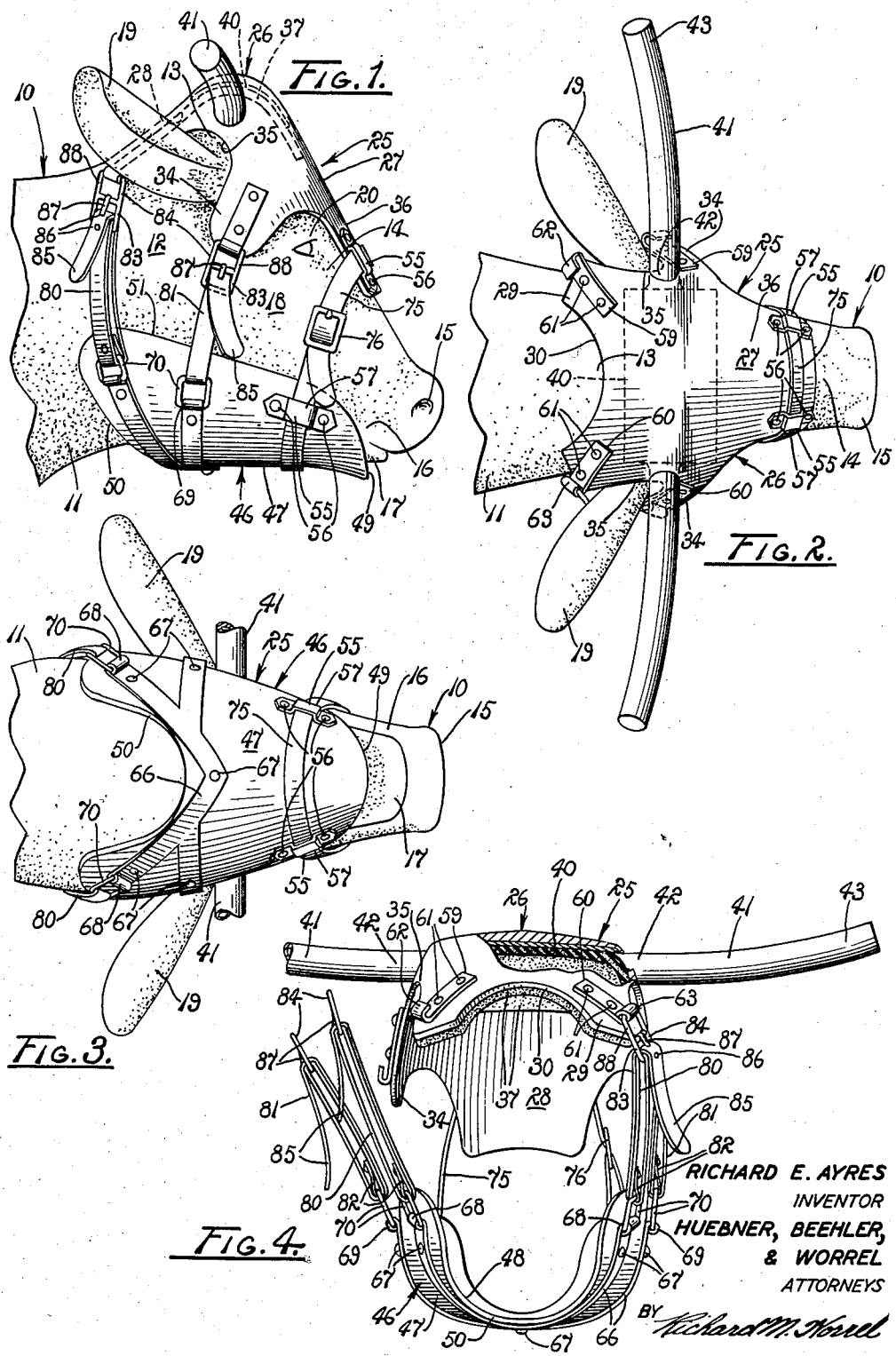

United States Patent Office 2,897,780
Patented Aug. 4, 1959

2,897,780

ANIMAL ATTACHMENT PROVIDING ARTIFICIAL HORNS

Richard E. Ayres, Woodlake, Calif.

Application July 22, 1957, Serial No. 673,401

4 Claims. (Cl. 119—1)

The present invention pertains to attachments for animals and more particularly to the mounting of an artificial attachment outwardly extended from the head of an animal for the purpose of simulating horns.

It is sometimes difficult for rodeo producers to acquire steers with horns for their performances and contests. However, it is essential that steers with horns be provided if roping and throwing are to be practiced. Horns are also required for other events. For example, if the rodeo includes "wild cow milking" then one cowboy tries to hold the "wild cow" still by its horns while another cowboy attempts the milking.

Raising steers with horns is quite expensive, however, because of the special care which must be given to the training of the horns. Ironically, horned steers soon outlive their usefulness as top rodeo stock. After that they have little market value since ordinarily, their meat is too tough for beef. Thus the rodeo producer generally must buy at a high price and sell at a low price. The difficulty and expense involved in acquiring horned steers has been so great as to reduce the number of rodeos that can be produced.

Wrestling steers by their horns is also somewhat objectionable from humane consideration. The steer is thrown by sharply twisting its neck using the horns somewhat like handlebars. This obviously hurts the steer and causes it to stiffen its legs and pull back or drag making it more difficult to throw.

Accordingly, it is an object of the present invention to provide an attachment for mounting artificial horns on an animal.

Another object is to provide artificial horns for polled steers.

Another object is to facilitate manual control of an animal's head.

Another object is to obviate the need for raising steers with horns for rodeos.

Another object is to enable the use of polled steers for rodeos.

Another object is to minimize the cost of rodeo stock.

Another object is to make cattle wrestling or throwing more humane.

Other objects are to provide an attachment of the nature described which is simple and economical to make and use, dependable in action, durable in construction, adaptable for a variety of animals and uses, and which is highly effective for carrying out its intended functions.

These together with other objects will become more fully apparent upon reference to the following description.

In the drawing:

Fig. 1 is a fragmentary side elevation of the head of a steer showing the attachment of the present invention fitted on the steer's head.

Fig. 2 is a top plan view of the steer and attachment shown in Fig. 1.

Fig. 3 is a bottom plan view of the steer and attachment shown in Fig. 1.

Fig. 4 is a rear view of the attachment alone shown partially broken away and in section and in a position ready to be fitted on a steer's head.

Referring more particularly to the drawing, a portion of a polled, that is dehorned, steer 10 is shown in Figs. 1 through 3, and for purposes of ready reference the parts of the steer are identified at this point. The steer has a neck 11; and a head 12 having a top 13, a face 14, a snout 15, an upper jaw 16, a lower jaw 17, and opposite sides 18. The ears 19 and the eyes 20 of the steer are also illustrated.

An artificial horn attachment constructed in accordance with the principles of the present invention is generally indicated by the numeral 25. The attachment includes a rigid upper plate 26 preferably of Fiberglas or other lightweight, durable and strong plastic having a convex outer surface 27, a concave inner surface 28 complementary to and adapted to fit on the top 13 of the head 12 of a polled steer 10. The plate has a pair of neck portions 29, best seen in Figs. 2 and 4, adapted to extend along the neck 11 of the steer rearwardly of its ears 19 and adjacent thereto. The rearwardly extended portions 29 define a rear cut-out section 30 fitting over the ridge in the steer's neck.

The upper plate 26 also has a pair of downwardly extended side portions 34 adapted to extend downwardly along the sides 18 of the steer's head 12 between the ears 19 and the eyes 20. The side portions define with the neck portions 29 at their respective sides of the attachment, a pair of side notches 35 for accommodating the steer's ears. Further, the plate has a forwardly downwardly extended face portion 36 adapted to fit against the face 14 of the steer between its eyes. It is to be noted that the upper plate is generally V-shaped having an upper apex so as to conform comfortably to the steer's head. Preferably, a cushion 37 of sponge rubber is bonded to the inner surface 28 underneath the neck portions 29 and the upper part of the face portion 36. If desirable, the cushion may be extended throughout the upper plate but this has not been found necessary in practical embodiments of the invention.

An inverted generally shallow U-shaped steel cup 40 conforming to the shape of the steer's head 11 is embedded in the upper plate 26 and is extended both forwardly and rearwardly from the apex of the upper plate, as best seen in Fig. 2. Elongated generally cylindrical rods 41 of rigid, solid material provide inner ends 42 rigidly secured to the cup at opposite sides of the upper plate and between the neck and side portions 29 and 34 thereof. The rods are in generally coaxial relation and have outer ends 43 outwardly extended in opposite directions from the upper plate. Preferably, the rods are slightly curved upwardly and rearwardly. The rods thus are adapted to extend outwardly from opposite sides of the head 12 of a steer 10 on which the upper plate 26 is fitted so as to constitute artificial horns for the steer. They may conveniently be formed of steel rods or tubing, or other material such as that of the attachment 25 itself.

The attachment 25 also includes a substantially semicylindrical rigid lower plate 46 having a convex outer surface 47, a concave inner surface 48 complementary to and adapted to fit over the lower jaw 17 of the steer 10. The lower plate is also preferably constructed of Fiberglas and has a downwardly turned front edge 49 adapted to be adjacent to the lower lip of the steer, and a rear edge 50 adapted to be adjacent to the neck 11 of the steer. The rear edge also has a cut-out comfortably fitted to the steer's neck, and a pair of side edges 51 extended along the upper jaw.

A pair of brackets 55 is secured to the face portion 36 of the upper plate 26 and to the lower plate 46 adjacent to the front edge 49 and side edges 51. All of the brackets are connected to the outer surfaces 27 and 47 of the plates by means of rivets 56 and form closed loops 57 with their respective plates.

Lugs 59 and 60 are secured to the neck portions 29 and side portions 34 of the upper plate 26 and on the outer surface 27 thereof by means of rivets 61. The lugs 59 on one side of the upper plate have upwardly turned open hooks 62 whereas the lugs 60 on the opposite side of the plate have upwardly reversely curved closed hooks 63.

As best seen in Fig. 3, a plurality of bars 66 are secured to the outer surface 47 of the lower plate 46 by means of rivets 67 and terminate in reversely arcuated closed rear and intermediate hooks 68 and 69, respectively. Substantially rectangular links 70 are pivotally received by the closed hooks 68 and 69.

The upper and lower plates 26 and 46 are positioned with their inner surfaces 28 and 48 in opposed facing relation, as best seen in Figs. 1 and 4. An elongated front strap 75 is threaded through the loops 57 of the brackets 55 and has adjacent opposite ends releasably adjustably interconnected by a buckle 76.

A pair of rear straps 80 and a pair of intermediate straps 81 are also provided. Each of these straps is identical in construction and only one is specifically described. Thus, each rear strap has a looped end 82 connected to a link 70 on the lower plate 46. The strap is extended through a buckle 83 of a clasp 84 and thence back through the link and once again through the buckle of the clasp. The strap thus has an adjusting end 85 in which is provided a plurality of perforations 86 adapted to receive a tongue 87 of the buckle 83. The clasp also has a link 88 received in one of the hooks 62 or 63 on the neck portions 29. The links 88 associated with the intermediate straps 81 are received in the hooks 62 or 63 on the side portions 34. The links 88 on one side of the attachment may be readily connected or disconnected to or from the lugs 60 inasmuch as the hooks 62 are open.

*Operation*

The operation of the described embodiment of the subject invention is believed to be readily apparent and is briefly summarized at this point.

In order to fit the attachment 25 of the present invention onto the head 12 of a polled steer 10, the buckle 76 is adjusted to its largest position by connecting the ends of the front strap 75 together. The releasable rear and intermediate straps 80 and 81 are removed from the hook 62. This condition of the attachment is shown in Fig. 4. The attachment is then fitted over the snout 15 of the steer 10 so that the upper plate 26 fits on the top of the steer's head and the lower plate 46 fits against its lower jaw 17. With the ears 19 properly fitted within the side notches 35, the links 88 of the releasable side straps 80 and 81 are fitted on the open hook 62. Thereupon the buckles 76 and 83 are tightened or loosened as required snugly to retain the attachment on the steer's head. It is to be noted that the front edge 49 of the lower plate 46 is down-turned slightly to allow the lower jaw and lip more freedom.

A steer 10 equipped with the attachment 25 is then ready for roping, wrestling, or wild cow milking contests. In order to throw the steer, the artificial horns or rods 41 are grasped in the same manner as natural horns would be and the head of the steer twisted in the well-known manner. It has been found that this does not hurt the steer as is the case when steers are thrown by twisting their neck by their natural horns. Accordingly, the steer does not drag and the task of throwing the steer is much easier and safer.

The problems incident to raising and acquiring horned steers for rodeo purposes are avoided by the present invention. Polled steers can be used for rodeos more frequently and more effectively than steers having horns. Furthermore, it is found that such steers have greater market value for beef after their use in rodeos.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having thus described my invention, what I claim as new and desire to secure by Letters Patent is:

1. An artificial horn attachment for a polled animal having a head and a lower jaw comprising an upper rigid plate complementary to and adapted to fit on the top of the head of such a polled animal; a pair of elongated rigid rods having inner ends rigidly secured to the upper plate on opposite sides thereof and in generally coaxial relation, and outer ends outwardly extended from the plate to constitute artificial horns for the animal; a rigid lower plate complementary to and adapted to fit under the lower jaw of the animal; and means releasably adjustably interconnecting the plates.

2. An artificial horn attachment for a polled steer having a head and a lower jaw comprising an upper rigid plate complementary to and adapted to fit on the top of the head of a polled steer; a pair of elongated rigid substantially cylindrical rods having inner ends rigidly secured to the upper plate on opposite sides thereof and in generally coaxial relation, and outer ends outwardly extended from the plate, the rods being adapted to extend outwardly from opposite sides of the head of a polled steer on which the upper plate is fitted so as to constitute artificial horns for the steer; a rigid lower plate complementary to and adapted to fit under the lower jaw of the steer; and means releasably adjustably interconnecting the plates.

3. An artificial horn attachment for a polled steer having a neck, a head extended from the neck and including a top, opposite sides, a front face, and a lower jaw, ears outwardly extended from the sides of the head, and eyes disposed forwardly of the ears on opposite sides of the face, comprising an upper rigid plate having a convex outer surface, a concave inner surface complementary to and adapted to fit on the top of the head of a polled steer, a pair of rearwardly extended neck portions adapted to extend along the neck of the steer rearwardly of the ears, a pair of opposite side portions adapted to extend down the sides of the head of the steer between the eyes and the ears, and a face portion adapted to extend down the face of the steer; a pair of elongated rigid substantially cylindrical rods having inner ends rigidly secured to the upper plate on opposite sides thereof between the neck and side portions and in generally coaxial relation, and outer ends outwardly extended from the plate, the rods being adapted to extend outwardly from opposite sides of the head of a polled steer on which the upper plate is fitted so as to constitute artificial horns for the steer; a generally semi-cylindrical rigid lower plate having a convex outer surface, a concave inner surface complementary to and adapted to fit under the lower jaw of the steer, opposite sides, and front and rear ends; and means releasably adjustably interconnecting opposite sides of the plates.

4. An artificial horn attachment for a polled steer having a neck, a head extended from the neck and including a top, opposite sides, a front face, an upper jaw, and a lower jaw, ears outwardly extending from the sides of the head, and eyes disposed forwardly of the ears on opposite sides of the face, comprising an upper inverted substantially V-shaped rigid plate having a convex outer surface, a concave inner surface complementary to and adapted to fit on the top of the head of a polled steer, a pair of rearwardly extended neck portions adapted to extend along the neck of the steer rearwardly of the ears, a pair of side portions adapted to extend down the sides of the head of the steer between the eyes and the ears, and a face portion adapted to extend down the face of the steer; a resiliently compressible cushion secured to the inner surface of the upper plate for cushioned engagement with the head of the steer; a pair of elongated rigid substantially cylindrical rods having inner ends rigidly secured to the upper plate on opposite sides thereof between the neck and side portions and in generally coaxial relation, and outer ends outwardly extended from the plate, the rods being adapted to extend outwardly from opposite sides of the head of a polled steer on which the upper plate is fitted so as to constitute artificial horns for the steer; a substantially semi-cylindrical rigid lower plate having a convex outer surface, a concave inner surface complementary to and adapted to fit under the lower jaw of the steer, opposite side edges, and front and rear ends; brackets secured to the face portion of the upper plate and to the front end of the lower plate forming closed loops with their respective plates, the loops extended generally transversely of the plates; a front strap threaded through the loops of the brackets adapted to circumscribe the upper and lower jaws of the steer and having opposite ends; buckling means releasable and adjustably interconnecting the opposite ends of the front strap; lugs secured to the neck and side portions of the upper plate, the lugs on one side of the upper plate having upwardly arcuate open hooks and the lugs on the opposite side having upwardly arcuate closed hooks; bars secured to the lower plate terminating in downwardly arcuate intermediate and rear closed hooks on opposite sides of the lower plate; links pivotally received by the hooks on the lower plate; adjustable clasps pivotally received by the open and closed hooks on the upper plate, the clasps in the open hooks being readily releasable therefrom; and adjustable rear and intermediate straps interconnecting the links and clasps, the rear and intermediate straps on one side being thereby releasable to facilitate fitting the attachment on the steer.

References Cited in the file of this patent

UNITED STATES PATENTS

| | | |
|---|---|---|
| 885,802 | Sterrick | Apr. 28, 1908 |
| 2,677,133 | Hoffman | May 4, 1954 |

FOREIGN PATENTS

| | | |
|---|---|---|
| 107,550 | Switzerland | Nov. 1, 1924 |
| 23,223 | Netherlands | Dec. 15, 1930 |